Patented Oct. 31, 1933

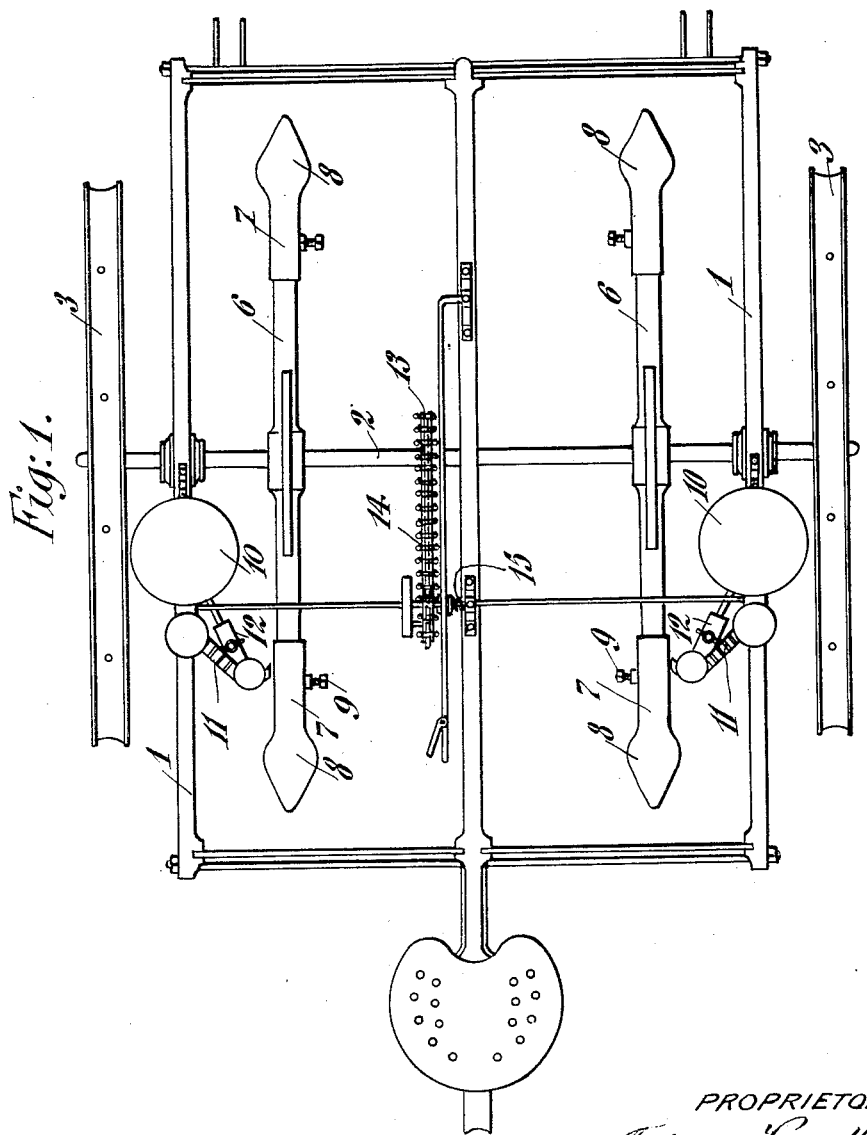

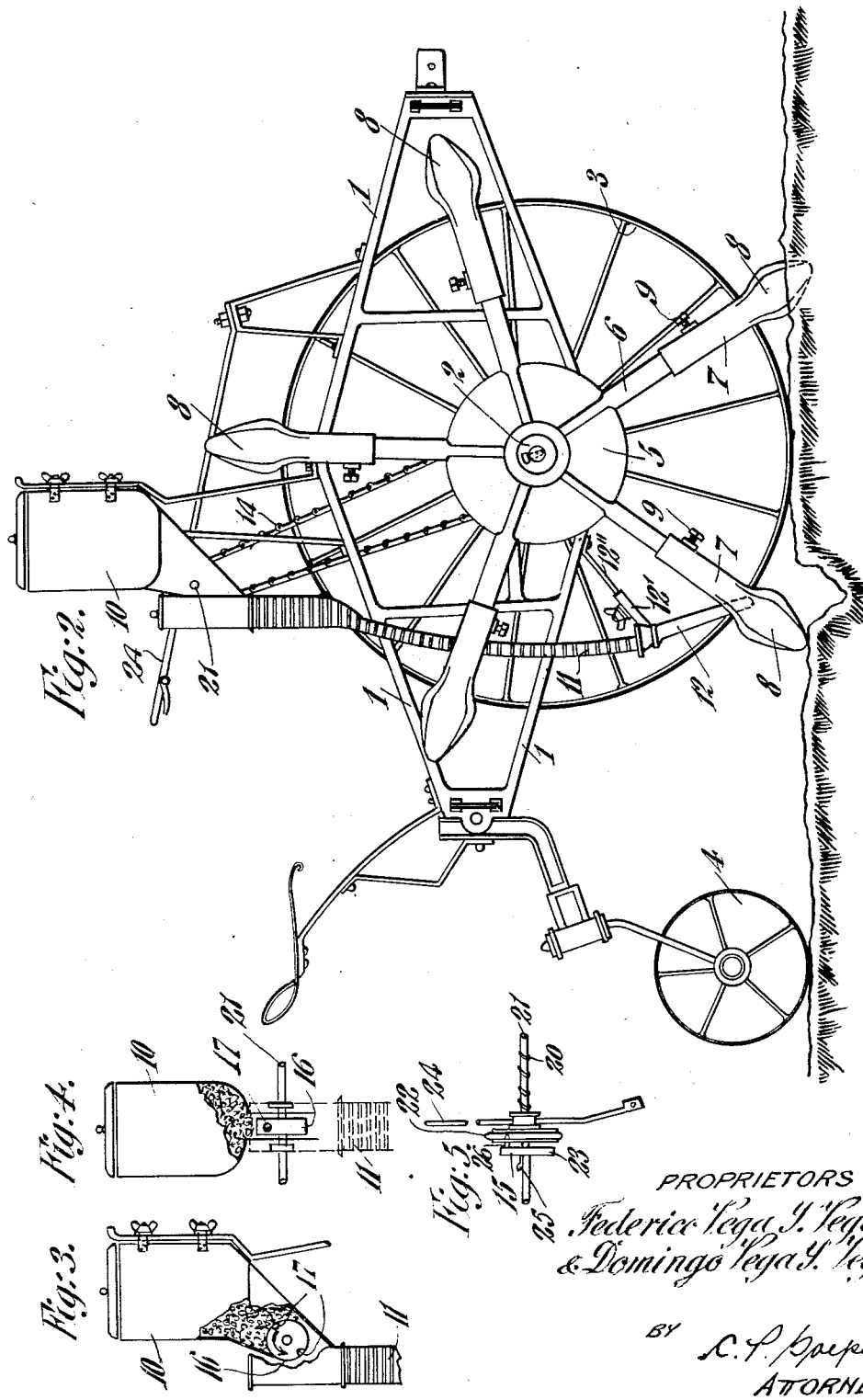

1,932,758

UNITED STATES PATENT OFFICE 1,932,758

PLANTING MACHINE

Federico Vega y Vega and Domingo Vega y Vega, Buenos Aires, Argentina

Application May 8, 1931, Serial No. 535,906, and in Argentina March 24, 1931

2 Claims. (Cl. 111—91)

Our present invention relates to a new type of planting machine for any kind of grain or seed, its object being to provide a very simple and efficient machine for planting in fields by opening small holes in the soil on the advance of the said machine.

The invention has other objects in view which will be clearly appreciated from the following description.

In order that our invention may be clearly understood and easily carried into practice, a preferred embodiment thereof has been shown in the accompanying drawings wherein, Figure 1 is a plan view of the planter.

Figure 2 is a left side elevation thereof.

Figure 3 shows a detail sectional view of the seed magazine and the member for the discharge thereof.

Figure 4 is a front partially sectional view of the magazine in Fig. 3 and

Figure 5 shows a detail of the clutching mechanism for the connection and disconnection of the seed distributing mechanism.

Similar characters of reference designate like parts throughout the figures.

According to the preferred embodiment shown, the planter comprises a suitable frame 1 carrying the axle 2 on the ends of which the motor wheels 3 are mounted. A small pilot wheel 4 at one end of the frame completes the support of the machine. On the axle 2 there are rigidly mounted the cast iron discs 5 to which the perforating digging arms 6 are connected so that as the wheels 3 rotate, each arm 6 turning therewith forms a hole or pocket in the earth. Said arms consist, as clearly illustrated in Figure 2 of two tubes, the outer one 7 of which is slidable and of a greater diameter and carries the digging or perforating end pieces 8. The relative position of both arms is regulated at will tube 7 being adjusted by means of the set screws 9, whereby the length of the arms and consequently, the depth of the perforation or hole in the ground may be regulated. Said perforating arms are radially distributed at equal angular distances around the shaft or axle 2. The machine may carry one, two or more groups of perforating arms on the axle, the distance between said groups determining the distance between the rows of holes or perforations to be formed in the ground. The fact that the perforating arms may be lengthened at will, permits the variation of depth of the holes or perforations in each row in the ground. In order that seeds and the like may be automatically fed into the holes formed in the ground by the perforating or digging arms 8, a number of magazines 10 are provided on the frame 1, corresponding with the number of groups of perforating arms set along the axle 2 of the frame. Said magazines have a discharge tube 11, the length of which may be regulated, by means of the adjusting spout 12. The discharge tube 11 is retained by slotted plate 12' and the fastening means associated therewith. When it is desired to extend the nose of the tube further toward the ground or to raise the same, the plate 12' may be slid adjustably back and forth on the extending arm plate 12". Furthermore it will be noted that as the frame is being drawn along the ground and the holes are formed in the ground the seeds in each magazine are deposited in each of the perforations made by the heads of the perforating heads 8.

An endless transporter is connected with each magazine and controls the feed of seed to the said tubes 11. To the said transporter small interchangeable holders are fixed, which may allow any kind of regulation as to size and number of seeds to be deposited. The transporter is driven by means of a pinion wheel 13 fixed to the axle 2, said pinion wheel 13 transmitting movement to the chain 14 and a clutch mechanism 15 when the latter is thrown into engagement.

The clutch mechanism as shown in Fig. 5 includes a tension spring 20 on cross shaft 21 for forcing clutch disc 22 carrying chain 14 against disc 23 when lever 24 is released. Disc 23 is held in position on shaft 21 by means of a key 25 and is provided with a pin 26 adapted to engage clutch disc 22 when the latter is forced against disc 23 by spring 20. When the discs are brought together, shaft 21 on which cylinders 16 in magazine 10 are mounted, rotates to regulate the discharge of seeds into the ground.

Within the said magazine or holder 10, and at the lower end thereof a small cylinder 16 is provided having a plurality of notches 17. Said cylinder on being rotated by the chain mechanism 14 above disclosed, permits the passage of a pre- determined amount of grain or seed, which is deposited in the bottom of the perforation made in the soil during the pulling of the frame, by any suitable means.

In the operation of the machine as it is being drawn along the ground, the perforating members 8 form holes. When the lever handle 24 is shifted the clutch discs are brought into engagement and rotary power is transmitted by chain 14 to shaft 21 on which the cylinders 16 are mounted, thus rotating them inside the magazines 10. Each cylinder is provided with a plurality of notches and carries a definite amount of seeds to be discharged through tube 11 into the hole formed in the ground. The clutch of shaft 21 may be thrown out of engagement with clutch disc 22 by merely shifting the lever. If the clutch is out of engagement, the chain 14 will idly drive clutch disc 22 without rotating shaft 21 thereby controlling at will the operation of the cylinder 16 in the magazines. It is to be noted from the foregoing that upon throwing the clutch mechanism into engagement the chain 14 transmits power to the shaft 21 to control the discharge of seeds into each hole. It is to be noted from the foregoing that upon throwing the clutch mechanism into engagement, the chain 11' transmits rotary power to the shaft 21, thus controlling the discharge of the seeds to be deposited in each hole in the ground.

The machine according to the present invention is adapted to be drawn by animal or tractive mechanical power and if desired, some chains or equivalent devices may be fixed to the frame and drawn on the soil behind the machine in order to cover the perforations made by the perforating heads 8, so that the seed be perfectly covered.

The operation of the said machine and the advantages thereof will be clearly understood from the foregoing description by those skilled in the art.

It is obvious that many mechanical and other changes may be introduced without departing from the scope of the present invention which has been clearly set forth in the appended claiming clauses.

Having now fully described and ascertained the nature of our present invention and in what manner the same is to be carried into practice, we declare that what we claim and desire to protect by Letters Patent is:

1. In a planting machine for seeds, a frame, a plurality of wheels, radially extending adjustable perforating members rotatable with the wheels for digging holes in the ground during the movement of the frame, a plurality of magazines for seeds mounted on the frame and having peripherally notched rotatable means therein for carrying seeds thereon in succession from the magazine, a conduit in connection with the magazine having its outlet end adjustably disposed near the ground so as to be in a position above each newly formed hole during the movement of the machine to drop seeds therein, transmission means in the frame for driving the rotatable means in the magazine, and manually operable clutching means in connection with the transmission means whereby to permit actuation of the rotatable means in the magazine for depositing a predeterminate amount of seed in each hole formed in the ground.

2. In a seed planting machine, having a frame, a shaft, a plurality of wheels on the shaft carrying said frame, a plurality of perforating members on the shaft rotatable with said wheels, having radially extending perforating members thereon for digging holes in the ground during the movement of the wheels, a plurality of magazines for seeds mounted on the frame, having peripherally notched cylindrical means therein for carrying a definite quantity of seeds thereon in succession, a conduit in communication with the magazine having its outlet end adjustably disposed near the ground so as to be in a position above each newly formed hole during the movement of the machine to drop seeds therein, transmission means on the shaft in connection with the cylindrical means in the magazine for regulating the amount of seeds dropped in succession through the conduit into the ground, and normally operable clutching means in connection with the transmission means for engaging and disengaging said transmission means with and from the cylindrical means whereby to control the discharge of seeds from the magazine.

FEDERICO VEGA Y VEGA.
DOMINGO VEGA Y VEGA.